I. B. JEFFRIES.
AIR TUBE FOR PNEUMATIC TIRES.
APPLICATION FILED AUG. 21, 1917.
1,285,719.
Patented Nov. 26, 1918.
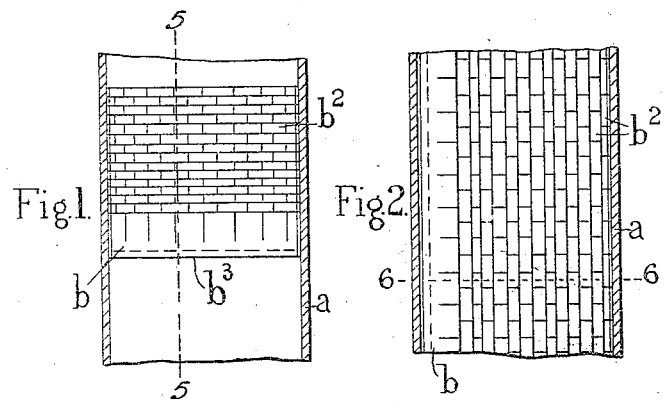
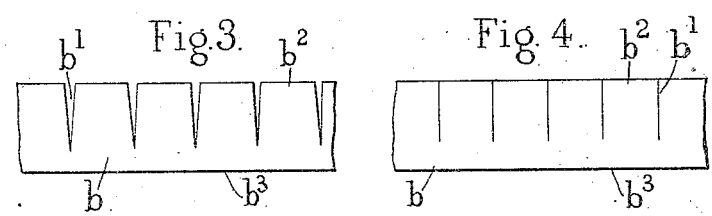
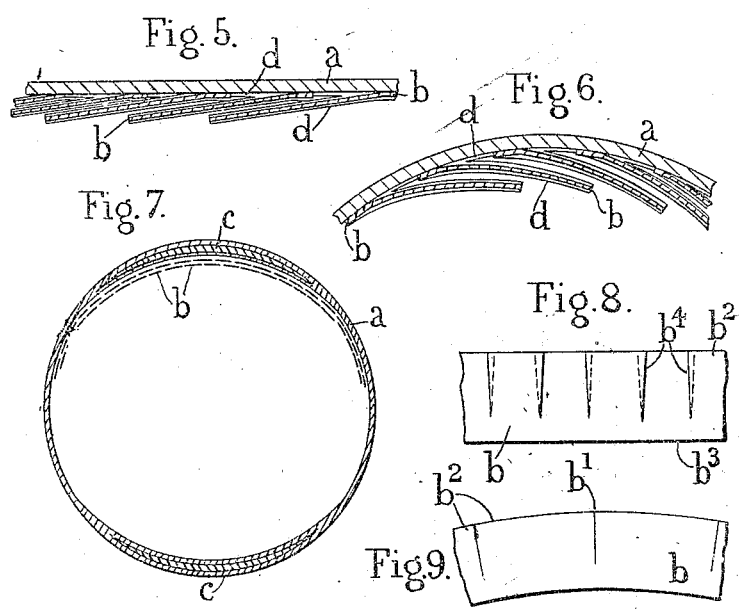
Inventor:
Isaac Benjamin Jeffries

UNITED STATES PATENT OFFICE.

ISAAC BENJAMIN JEFFRIES, OF LLANELLY, WALES.

AIR-TUBE FOR PNEUMATIC TIRES.

1,285,719.   Specification of Letters Patent.   Patented Nov. 26, 1918.

Application filed August 21, 1917.   Serial No. 187,408.

*To all whom it may concern:*

Be it known that I, ISAAC BENJAMIN JEFFRIES, known and trading as ISAAC BENJAMIN, a subject of the King of Great Britain, residing at Llanelly, in the county of Carmarthen, South Wales, have invented certain new and useful Improvements in Air-Tubes for Pneumatic Tires, of which the following is a full, clear, and exact description.

The object of the present invention is to construct an improved self-sealing air tube for pneumatic tires.

The present invention relates to that type of air tube in which a number of strips of thin rubber are cemented or vulcanized to the tube along one edge only, leaving the greater portion of the strips loose and in contact with the inner surface of the tube or adjacent thereto. In some cases these strips are arranged transversely, and in other cases longitudinally, of the tread. Such strips are so fixed that each strip overlaps the next strip and acts as a flap valve when the tube is punctured. It has also been proposed to fix a number of separate small flaps in rows slightly separated across the inside of the air tube, like fish scales, but such a construction entails considerable work.

According to the present invention I employ long strips, and each strip is cut from its loose edge toward that edge which is fixed to the air tube, so that each long strip is formed into a number of short flaps, the sides of which are in close contact. This method of manufacture effects a considerable saving of time compared with the fixing of separate flaps, and produces a better article than the use of strips which have an uncut loose edge. The cuts are so arranged that those in an under strip of rubber pass under the centers of the flaps above them. The strips are preferably of such width that there are at least two layers of the protecting flaps over the whole of that portion of the air tube which it is desired to protect. The strips and flaps, and any portion of the air tube between the strips, may be coated with a suitable non-drying material, such as glycerin or soft soap. This non-drying material will assist in making an air-tight joint between the flaps and the inner tube when a puncture takes place.

It will be understood that the strips may be fixed in position on the air tube when this latter has been turned inside out. The tube is then returned and the ends of the tube will be connected in any usual manner. The strips may, however, be fixed in position upon the material from which the tube is to be made, which material is then put onto a mandrel or former and closed along its inner side in any usual manner.

The invention is illustrated in the accompanying drawings, in which:—

Figure 1 is a section of a portion of an air tube showing the interior surface of the outer half of the tube, and Fig. 2 is a similar view showing a modification.

Figs. 3 and 4 show face views of two forms of the strips to be applied to the air tube.

Fig. 5 is a longitudinal section of part of the air tube shown in Fig. 1, taken on the line 5—5, and Fig. 6 is a transverse section of part of the tube shown in Fig. 2, taken on the line 6—6.

Fig. 7 is a transverse section of an air tube showing a further modification. This view is diagrammatic so far as the strips and flaps are concerned.

Fig. 8 is a face view of a strip and Fig. 9 is a face view of a modified form of strip.

In Figs. 1, 2, 5 and 6, the air tube $a$ is of any ordinary kind, being made entirely from a sheet of rubber, and in the interior thereof are cemented or vulcanized long strips $b$ of thin rubber, which are cut at $b^1$ to form separate flaps $b^2$, the sides of which are in close contact. These strips $b$ are fixed to the air tube $a$ along their uncut sides $b^3$, leaving the flaps $b^2$ loose in the interior of the air tube and as close to the body of the tube $a$ as possible. The flaps $b^2$ are of such a length that there are at least two layers at every part of the air tube which is likely to be punctured.

In Fig. 1 the strips $b$ are shown fixed transversely across the inner surface of the air tube $a$, but it is preferred to fix the strips $b$ longitudinally of the air tube as shown in Fig. 2, as a tube thus constructed is more easily joined up at the ends without leaving a space having no flaps $b^2$, or where the flaps $b^2$ do not properly overlap each other.

The strips $b$, when cut at $b^1$ as shown in Fig. 4, without removing any portion thereof, and fixed within the air tube $a$ transversely thereof as shown in Fig. 1, have a tendency for the edges $b^4$ of the flaps $b^2$ to overlap adjacent flaps $b^2$ of the same strip, as shown in Fig. 8. This is due to the fact that the uncut edge $b^3$ of the strip, being fixed to the air tube $a$ when this latter is inside out, is compressed when the tube is returned, whereas the outer edges of the flaps $b^2$ retain their original length. This lateral overlapping of the strips $b^2$ should be avoided as the best results are obtained when all the flaps just meet at the edges as shown in Fig. 1.

In order to obtain the desired result, the strips $b$ may be slightly cut away at $b^1$, as shown in Fig. 3 so that their bases are wider than their outer ends, or the strip shown in Fig. 4 may be stretched longitudinally until it assumes the appearance shown in Fig. 3, and it may be attached to the air tube $a$ in this stretched condition.

When the strips are attached longitudinally to the air tube $a$, as shown in Fig. 2, the flaps $b^2$ have little or no tendency to overlap each other at the outer edges $b^4$, as shown in Fig. 8.

It may happen that a tire becomes entirely or partially deflated owing to a leaky valve, in which case a nail passing through the outer cover would probably puncture the air tube on the rim side thereof. To avoid this inconvenience the air tube $a$ may be provided with a self-sealing compound $c$ located within the body thereof as shown in Fig. 7. This self-sealing compound may be located on both sides of the tube as shown in Fig. 7, as is well known in the art.

Although the strips $b$ are shown as straight in Figs. 1, 2, 3, 4 and 8, they may be arcuate when arranged transversely of the air tube. A portion of such a strip is shown in Fig. 9.

It will be understood that the width of the strips $b$ may be varied and that the cuts $b^1$ may be made at various distances apart. In Fig. 9 the width of the strips $b$ is less, and the cuts $b^1$ are wider apart than shown in Figs. 3, 4 and 8.

In Figs. 5 and 6 $d$ represents the non-drying material such as glycerin or soft soap.

What I claim as my invention is:—

1. In an air tube for a pneumatic tire, the combination of a tube, long strips fixed at one edge to the interior of said tube and overlapping each other, and flaps formed in the loose edges of said long strips by cutting these latter, the said flaps being wider at their bases than at their outer ends when the long strips are fixed to the tube inside out and the edges of such flaps just meeting when the tube is re-turned, substantially as set forth.

2. In an air tube for a pneumatic tire, the combination of a tube, long strips fixed at one edge to the interior of said tube and overlapping each other, and flaps which are wider at their bases than at their outer ends when the long strips are fixed to the tube when it is turned inside out, said flaps being produced by cutting away portions of the loose strips, substantially as set forth.

In witness whereof I have hereunto set my hand.

ISAAC BENJAMIN JEFFRIES.